United States Patent
Holenarsipur et al.

(10) Patent No.: US 10,503,258 B2
(45) Date of Patent: Dec. 10, 2019

(54) INPUT MECHANISM WITH FORCE AND ROTATION INPUTS AND HAPTIC FEEDBACK

(71) Applicant: Apple Inc., Cupertino, CA (US)

(72) Inventors: Prashanth Holenarsipur, Fremont, CA (US); Xingxing Cai, Cupertino, CA (US); Stephen N. Sweet, San Jose, CA (US); Richard Ruh, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/449,816

(22) Filed: Mar. 3, 2017

(65) Prior Publication Data
US 2017/0255266 A1    Sep. 7, 2017

Related U.S. Application Data

(60) Provisional application No. 62/304,063, filed on Mar. 4, 2016.

(51) Int. Cl.
*G06F 3/01* (2006.01)
*G06F 1/16* (2006.01)
(Continued)

(52) U.S. Cl.
CPC .............. *G06F 3/016* (2013.01); *G06F 1/163* (2013.01); *G06F 1/169* (2013.01); *G06F 3/02* (2013.01);
(Continued)

(58) Field of Classification Search
CPC .......... G06F 3/016; G06F 3/045; G04G 21/00
See application file for complete search history.

(56) References Cited

U.S. PATENT DOCUMENTS

| | | | |
|---|---|---|---|
| 4,304,133 A | 12/1981 | Feamster | |
| 5,483,261 A | 1/1996 | Yasutake | |

(Continued)

FOREIGN PATENT DOCUMENTS

| | | |
|---|---|---|
| CN | 1496549 A | 5/2004 |
| CN | 101231553 A | 7/2008 |

(Continued)

OTHER PUBLICATIONS

Notice of Allowance dated Apr. 19, 2017, for U.S. Appl. No. 14/754,416, filed Jun. 29, 2015, 5 pages.

(Continued)

*Primary Examiner* — Sepehr Azari
(74) *Attorney, Agent, or Firm* — Kubota & Basol LLP

(57) ABSTRACT

An electronic device is disclosed. In some examples, the electronic device comprises a housing and an input mechanism cooperatively engaged with the housing and configured to rotate in a first direction about a rotation axis. In some examples, the electronic device comprises an input sensor configured to sense an input at the input mechanism based on rotation of the input mechanism. In some examples, the electronic device comprises an actuator coupled to the housing and configured to displace the input mechanism. In some examples, the electronic device comprises a force sensor coupled to the input mechanism and configured to sense an input at the input mechanism based on a force applied to the input mechanism along the second axis.

20 Claims, 10 Drawing Sheets

(51) Int. Cl.
*G06F 3/0362* (2013.01)
*G06F 3/02* (2006.01)
*G06F 3/044* (2006.01)
*G06F 3/041* (2006.01)

(52) U.S. Cl.
CPC ............ *G06F 3/0362* (2013.01); *G06F 3/044* (2013.01); *G06F 3/0416* (2013.01); *G06F 2203/04105* (2013.01); *G06F 2203/04108* (2013.01)

(56) References Cited

U.S. PATENT DOCUMENTS

| | | |
|---|---|---|
| 5,488,204 A | 1/1996 | Mead et al. |
| 5,587,937 A | 12/1996 | Massie et al. |
| 5,709,219 A | 1/1998 | Chen et al. |
| 5,825,352 A | 10/1998 | Bisset et al. |
| 5,835,079 A | 11/1998 | Shieh |
| 5,880,411 A | 3/1999 | Gillespie et al. |
| 6,020,876 A | 2/2000 | Rosenberg et al. |
| 6,154,201 A | 11/2000 | Levin et al. |
| 6,171,191 B1 | 1/2001 | Ogata et al. |
| 6,188,391 B1 | 2/2001 | Seely et al. |
| 6,211,861 B1 | 4/2001 | Rosenberg et al. |
| 6,257,529 B1 | 7/2001 | Kubo et al. |
| 6,310,610 B1 | 10/2001 | Beaton et al. |
| 6,323,846 B1 | 11/2001 | Westerman et al. |
| 6,394,906 B1 | 5/2002 | Ogata |
| 6,636,197 B1 | 10/2003 | Goldenberg et al. |
| 6,661,438 B1 | 12/2003 | Shiraishi et al. |
| 6,686,911 B1 | 2/2004 | Levin et al. |
| 6,690,387 B2 | 2/2004 | Zimmerman et al. |
| 6,822,635 B2 | 11/2004 | Shahoian et al. |
| 6,956,558 B1 | 10/2005 | Rosenberg et al. |
| 7,015,894 B2 | 3/2006 | Morohoshi |
| 7,184,064 B2 | 2/2007 | Zimmerman et al. |
| 7,450,110 B2 | 11/2008 | Shahoian et al. |
| 7,489,309 B2 | 2/2009 | Levin et al. |
| 7,564,444 B2 | 7/2009 | Rosenberg et al. |
| 7,567,243 B2 | 7/2009 | Hayward |
| 7,663,607 B2 | 2/2010 | Hotelling et al. |
| 8,174,508 B2 | 5/2012 | Sinclair et al. |
| 8,479,122 B2 | 7/2013 | Hotelling et al. |
| 9,535,501 B1 | 1/2017 | Moussette et al. |
| 9,921,652 B2 | 3/2018 | Moussette et al. |
| 9,971,407 B2 | 5/2018 | Holenarsipur |
| 2003/0103044 A1 | 6/2003 | Takashi et al. |
| 2003/0193475 A1 | 10/2003 | Rosenberg et al. |
| 2004/0032395 A1 | 2/2004 | Goldenberg et al. |
| 2004/0233159 A1 | 11/2004 | Badarneh |
| 2004/0251061 A1 | 12/2004 | Augustine |
| 2006/0187201 A1 | 8/2006 | Rosenberg et al. |
| 2006/0197753 A1 | 9/2006 | Hotelling |
| 2006/0255683 A1 | 11/2006 | Suzuki et al. |
| 2007/0085448 A1 | 4/2007 | Kurosawa |
| 2007/0091063 A1 | 4/2007 | Nakamura et al. |
| 2007/0119698 A1 | 5/2007 | Day |
| 2007/0182708 A1 | 8/2007 | Poupyrev et al. |
| 2007/0236450 A1 | 10/2007 | Colgate et al. |
| 2007/0279401 A1 | 12/2007 | Ramstein et al. |
| 2008/0158149 A1* | 7/2008 | Levin ...................... G06F 3/016 345/156 |
| 2008/0238879 A1 | 10/2008 | Jaeger et al. |
| 2010/0271402 A1 | 10/2010 | Nagashima et al. |
| 2011/0141052 A1* | 6/2011 | Bernstein ................ G06F 3/016 345/174 |
| 2012/0032031 A1 | 2/2012 | Grohmann et al. |
| 2012/0249315 A1 | 10/2012 | Vanhelle et al. |
| 2014/0139436 A1 | 5/2014 | Ramstein et al. |
| 2014/0315642 A1 | 10/2014 | Grant et al. |
| 2014/0340372 A1 | 11/2014 | Olsson et al. |
| 2015/0041289 A1 | 2/2015 | Ely |
| 2015/0145657 A1 | 5/2015 | Levesque et al. |
| 2015/0370376 A1* | 12/2015 | Harley .................. G06F 3/0414 345/174 |
| 2016/0098016 A1* | 4/2016 | Ely ........................ G04G 21/00 368/308 |
| 2016/0171804 A1 | 6/2016 | Chaar et al. |
| 2016/0378187 A1 | 12/2016 | Moussette et al. |
| 2017/0090572 A1 | 3/2017 | Holenarsipur |

FOREIGN PATENT DOCUMENTS

| | | |
|---|---|---|
| CN | 101861561 A | 10/2010 |
| CN | 104024989 A | 9/2014 |
| CN | 104107539 A | 10/2014 |
| JP | 2000-163031 | 6/2000 |
| JP | 2001-202178 A | 7/2001 |
| JP | 2002-342033 | 11/2002 |
| JP | 2004-184396 A | 7/2004 |
| JP | 2010-515153 A | 5/2010 |
| JP | 2015-111416 A | 6/2015 |
| WO | WO-03/038800 A1 | 5/2003 |
| WO | WO-2008/085487 A1 | 7/2008 |
| WO | WO-2013/101472 A1 | 7/2013 |
| WO | WO-2014/200766 | 12/2014 |
| WO | WO-2015/034960 A1 | 3/2015 |
| WO | WO-2017/152139 A1 | 9/2017 |

OTHER PUBLICATIONS

Extended European Search Report dated Nov. 25, 2016, for EP Application No. 16171125.4, seven pages.
Final Office Action dated Nov. 4, 2016, for U.S. Appl. No. 14/754,416, filed Jun. 29, 2015, 16 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Levesque, V. (2000). "Demonstration of Laterotactile Principle," located at http://www.cim.mcgill.ca/~haptic/laterotactile/principle.php, last visited on Jun. 3, 2015, one page.
Non Final Office Action dated May 10, 2016, for U.S. Appl. No. 14/754,416, filed Jun. 29, 2015, 18 pages.
Non Final Office Action dated May 10, 2016, for U.S. Appl. No. 14/974,606, filed Dec. 18, 2015, 18 pages.
Notice of Allowance dated Sep. 8, 2016, for U.S. Appl. No. 14/974,606, filed Dec. 18, 2015, five pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
U.S. Appl. No. 14/754,416, filed Jun. 29, 2015. (copy not attached).
U.S. Appl. No. 14/796,915, filed Jul. 10, 2015. (copy not attached).
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Non Final Office Action dated Jul. 19, 2017, for U.S. Appl. No. 14/870,697, filed Sep. 30, 2015, fifteen pages.
Notice of Allowance dated, Aug. 2, 2017, for U.S. Appl. No. 14/754,416, filed Jun. 29, 2015, eight pages.
Notice of Allowance dated Jan. 29, 2018, for U.S. Appl. No. 14/870,697, filed Sep. 30, 2015, eight pages.

* cited by examiner

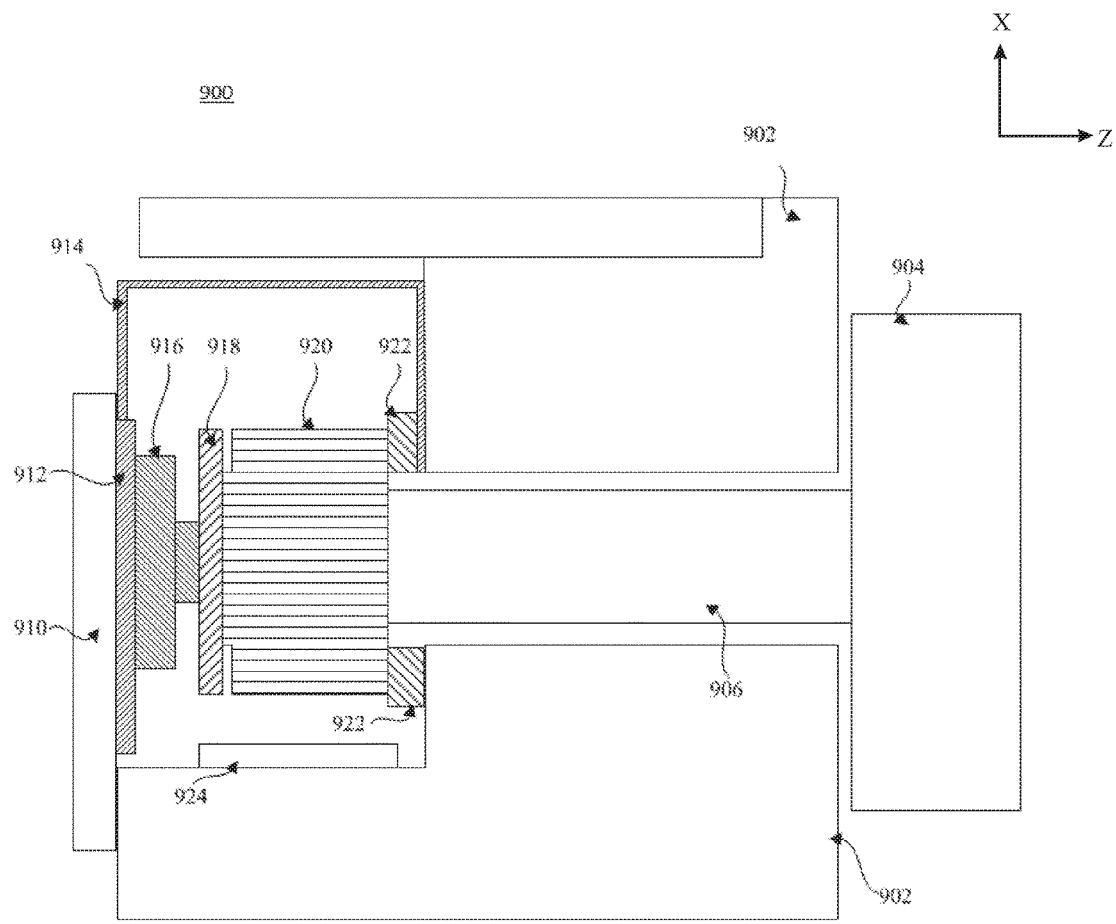
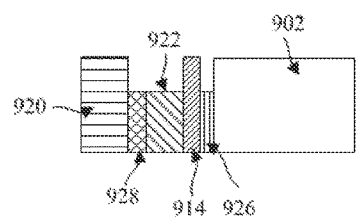
FIG. 9A
FIG. 9B

INPUT MECHANISM WITH FORCE AND ROTATION INPUTS AND HAPTIC FEEDBACK

CROSS REFERENCE TO RELATED APPLICATIONS

This application claims the benefit under 35 USC 119(3) of U.S. Patent Application No. 62/304,063, filed Mar. 4, 2016, the contents of which are incorporated herein by reference in their entirety for all purposes.

FIELD OF THE DISCLOSURE

This relates generally to user inputs, such as mechanical inputs, and more particularly, to providing haptic feedback on such inputs.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. However, devices that accept non-mechanical inputs, such as capacitive touch input, often do not provide tactile feedback to a user.

In addition to touch panels/touch screens, many electronic devices may also have mechanical inputs, such as buttons, switches, and/or knobs. These mechanical inputs can control power (i.e., on/off) and volume for the electronic devices, among other functions. However, sometimes these mechanical inputs also fail to give a user tactile feedback, such as the "click-click-click" feeling of winding a mechanical alarm clock with a knob or a mechanical watch crown.

SUMMARY OF THE DISCLOSURE

Some electronic devices may include mechanical inputs, such as buttons, switches, and/or knobs. These mechanical inputs can control power (i.e., on/off) and volume for the electronic devices, among other functions. However, sometimes these mechanical inputs can fail to give a user tactile feedback, such as the "click-click-click" feeling of winding a mechanical alarm clock or watch with a knob. It can be beneficial to provide haptic or tactile feedback to a user who is interacting with a mechanical input of an electronic device to give the user a richer interaction experience with the device. Devices that accept non-mechanical inputs, such as touch input, can also provide a better user experience with haptic or tactile feedback provided to a user via their non-mechanical input mechanisms (e.g., via their touch screens). In some examples, such haptic feedback can constitute giving the user a sensation that the user's finger is moving over a ridge, bump or valley feature on an otherwise smooth surface. This type of sensation can simulate the feeling of the user rotating a mechanical knob against the teeth of an internal gear (e.g., the feeling of a detent when turning a rotary input, such as the "click-click-click" feeling of winding a mechanical watch). Haptic feedback as described above can give the user feedback about the effect of the user's input on the electronic device, such as changing the zoom-scale of content displayed on the device and scrolling through menu items displayed on the device in response to the user's rotary input. In some examples, the above haptic feedback can be provided to the user via displacement of a mechanical input that is orthogonal to the direction of the movement of the mechanical input provided by the user (e.g., displacement of a rotary input that is orthogonal to the rotary input's rotational movement). Various examples of the above are provided in this disclosure.

BRIEF DESCRIPTION OF THE DRAWINGS

FIGS. 9A-9B illustrate an exemplary piezoelectric implementation of a haptic feedback arrangement according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some electronic devices may include mechanical inputs, such as buttons and/or switches. These mechanical inputs can control power (i.e., on/off) and volume for the electronic devices, among other functions. However, sometimes these mechanical inputs can fail to give a user tactile feedback, such as the "click-click-click" feeling of winding a mechanical alarm clock or watch with a knob. It can be beneficial to provide haptic or tactile feedback to a user who is interacting with a mechanical input of an electronic device to give the user a richer interaction experience with the device. Devices that accept non-mechanical inputs, such as touch input, can also provide a better user experience with haptic or tactile feedback provided to a user via their non-mechanical input mechanisms (e.g., via their touch screens). In some examples, such haptic feedback can constitute giving the user a sensation that the user's finger is moving over a ridge, bump or valley feature on an otherwise smooth surface. This type of sensation can simulate the feeling of the user rotating a mechanical knob against the teeth of an internal gear (e.g., the feeling of a detent when turning a rotary input, such as the "click-click-click" feeling of winding a mechanical watch). Haptic feedback as described above can give the user feedback about the effect of the user's input on the electronic device, such as changing the zoom-scale of content displayed on the device in response to the user's rotary input. In some examples, the above haptic feedback can be provided to the user via displacement of a mechanical input that is orthogonal to the direction of the movement of the mechanical input provided by the user (e.g., displacement of a rotary input that is orthogonal to the rotary input's rotational movement). Various examples of the above are provided in this disclosure.

Figure 1:
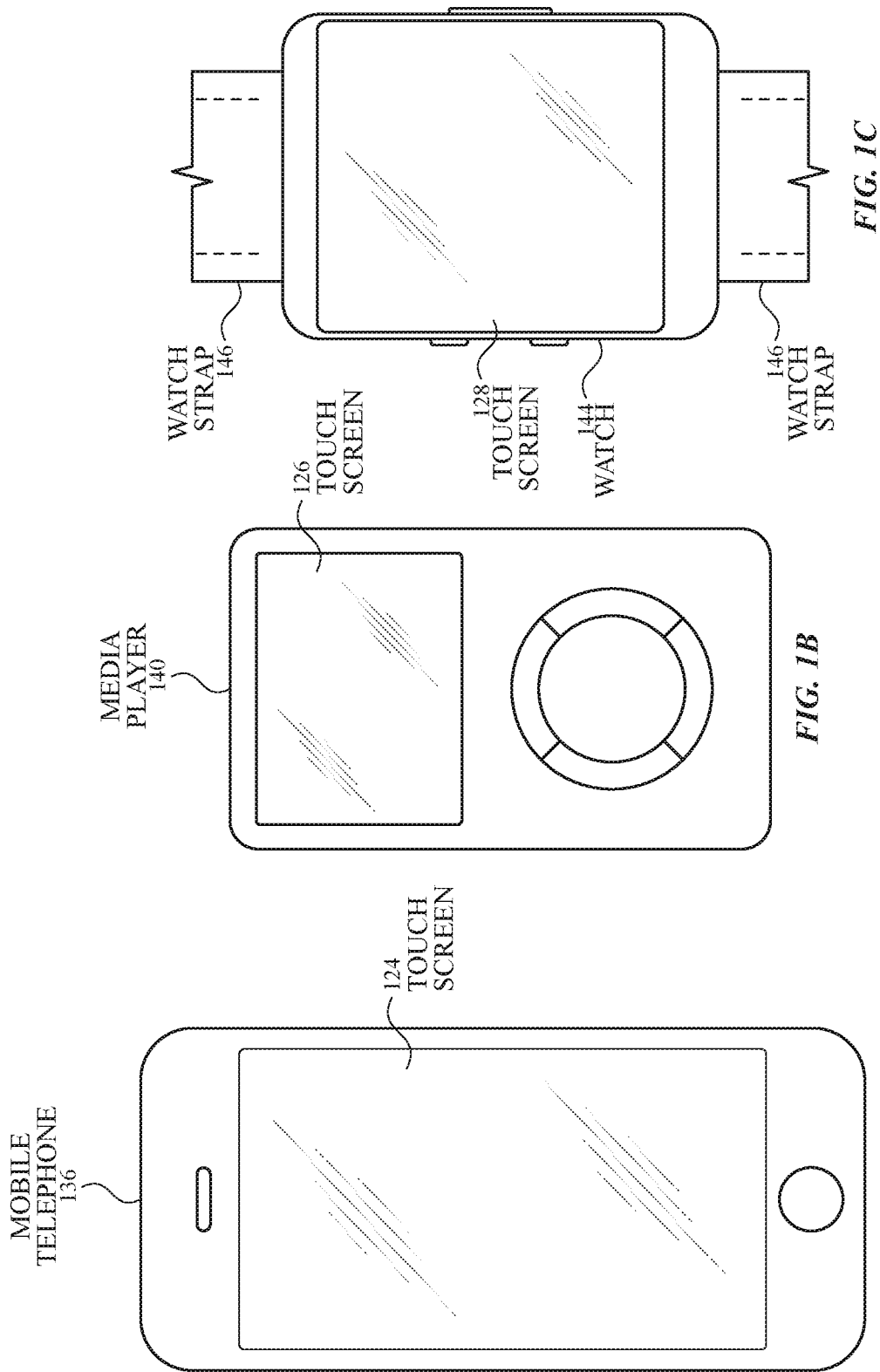
FIGS. 1A-1C illustrate exemplary devices in which the haptic feedback of the disclosure can be implemented according to examples of the disclosure.

FIGS. 1A-1C show exemplary devices in which the haptic feedback of the disclosure can be implemented. FIG. 1A illustrates an example mobile telephone 136 that includes a touch screen 124. FIG. 1B illustrates an example digital media player 140 that includes a touch screen 126. FIG. 1C illustrates an example watch 144 that includes a touch screen 128. It is understood that the above touch screens can be implemented in other devices as well, such as tablet computers. Further, the above devices can include mechanical inputs, as described with reference to FIG. 2.

In some examples, touch screens 124, 126 and 128 can be based on self-capacitance. A self-capacitance based touch system can include a matrix of small, individual plates of conductive material that can be referred to as touch pixel electrodes. For example, a touch screen can include a plurality of individual touch pixel electrodes, each touch pixel electrode identifying or representing a unique location on the touch screen at which touch or proximity (i.e., a touch or proximity event) is to be sensed, and each touch pixel electrode being electrically isolated from the other touch pixel electrodes in the touch screen. Such a touch screen can be referred to as a pixelated self-capacitance touch screen. During operation, a touch pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126 and 128 can be based on mutual capacitance. A mutual capacitance based touch system can include drive and sense lines that may cross over each other on different layers, or may be adjacent to each other on the same layer. The crossing or adjacent locations can be referred to as touch pixels. During operation, the drive line can be stimulated with an AC waveform and the mutual capacitance of the touch pixel can be measured. As an object approaches the touch pixel, the mutual capacitance of the touch pixel can change. This change in the mutual capacitance of the touch pixel can be detected and measured by the touch sensing system to determine the positions of multiple objects when they touch, or come in proximity to, the touch screen.

Figure 2:
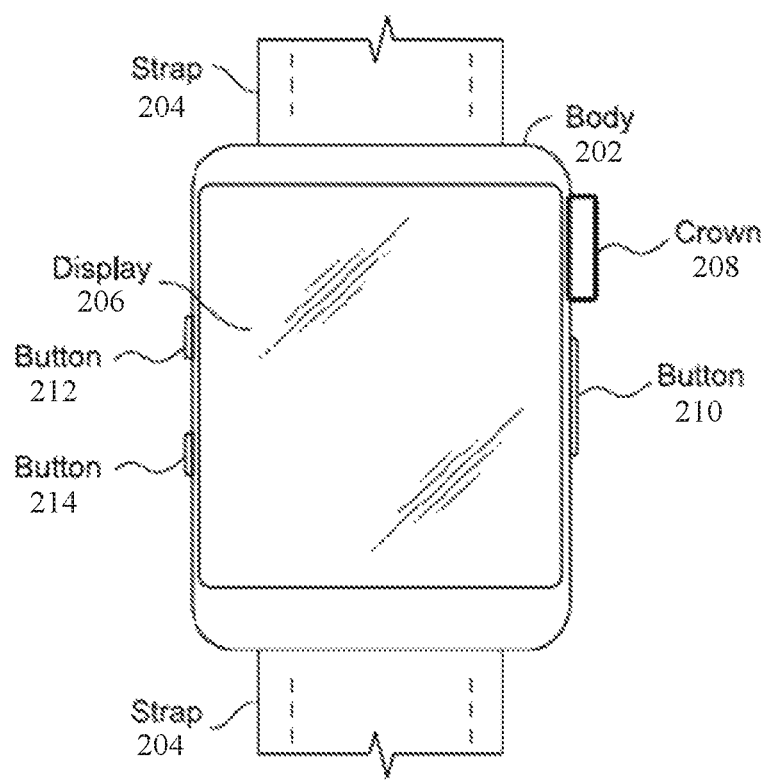
FIG. 2 illustrates an exemplary personal electronic device in which the haptic feedback of the disclosure can be implemented according to examples of the disclosure.

FIG. 2 illustrates exemplary personal electronic device 200 in which the haptic feedback of the disclosure can be implemented according to examples of the disclosure. Device 200 can be any of mobile telephone 136, digital media player 140, watch 144, or any other wearable and/or non-wearable electronic device. In the illustrated example, device 200 is a watch (e.g., watch 144) that generally includes body 202 and strap 204 (which can correspond to watch strap 146 above) for affixing device 200 to the body of a user. That is, device 200 can be wearable. Body 202 can be designed to couple to straps 204. Device 200 can have touch-sensitive display screen 206 (hereafter touchscreen) (which can correspond to touch screens 124, 126, and 128 above) and crown 208. Device 200 can also have buttons 210, 212, and 214. In some examples, buttons 210, 212, and 214 can be mechanical inputs, meaning that the buttons can be connected to a sensor for converting physical movement of the buttons into electrical signals. Though device 200 is illustrated as being a watch, it is understood that the examples of the disclosure can be implemented in devices other than watches, such as tablet computers, mobile phones, or any other wearable or non-wearable electronic device that can include a rotary input such as a crown 208 and/or a rotating bezel (not shown).

Conventionally, the term 'crown,' in the context of a watch, can refer to the cap atop a stem or shaft for winding the watch. In the context of a personal electronic device 200, the crown can be a physical component of the electronic device, rather than a virtual crown on a touch sensitive display. Crown 208 can be mechanical, meaning that it can be connected to a sensor for converting physical movement of the crown into electrical signals (described in more detail below). In some examples, crown 208 can rotate in two directions of rotation (e.g., forward and backward, or clockwise and counter-clockwise). Crown 208 can also be pushed in towards the body 202 of device 200 and/or be pulled away from the device. Crown 208 can be touch-sensitive, for example, using capacitive touch technologies or other suitable technologies that can detect whether a user is touching the crown. Moreover, crown 208 can further be configured to tilt in one or more directions or slide along a track at least partially around a perimeter of body 202. In some examples, more than one crown 208 can be included in device 200. The visual appearance of crown 208 can, but need not, resemble crowns of conventional watches. Buttons 210, 212, and 214, if included, can each be a physical or a touch-sensitive button. That is, the buttons may be, for example, physical buttons or capacitive buttons. Further, body 202, which can include a bezel, may have predetermined regions on the bezel that act as buttons. In some examples, body 202 can include a rotating bezel (not shown) that can be positioned around a perimeter of display 206, and can be rotated around the perimeter by a user. In some examples, the visual appearance of rotating bezel can, but need not, resemble rotating bezels in conventional watches. In some examples, the rotating bezel can be configured to perform analogous input operations and behaviors as the crown 208 (i.e., rotation in two directions of rotation, pushing toward and/or pulling away from the device, etc.). In some examples, other rotating input configurations can be used analogously as mechanical inputs to device 200.

Display 206 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Display 206 can allow a user to perform various functions by touching or hovering near the touch sensor panel using one or more fingers or other objects.

In some examples, device 200 can further include one or more pressure sensors (not shown) for detecting an amount of force or pressure applied to the display 206. The amount of force or pressure applied to display 206 can be used as an input to device 200 to perform any desired operation, such as making a selection, entering or exiting a menu, causing the display of additional options/actions, or the like. In some examples, different operations can be performed based on the amount of force or pressure being applied to display 206. The one or more pressure sensors can further be used to determine a position of the force that is being applied to display 206.

Figure 3:
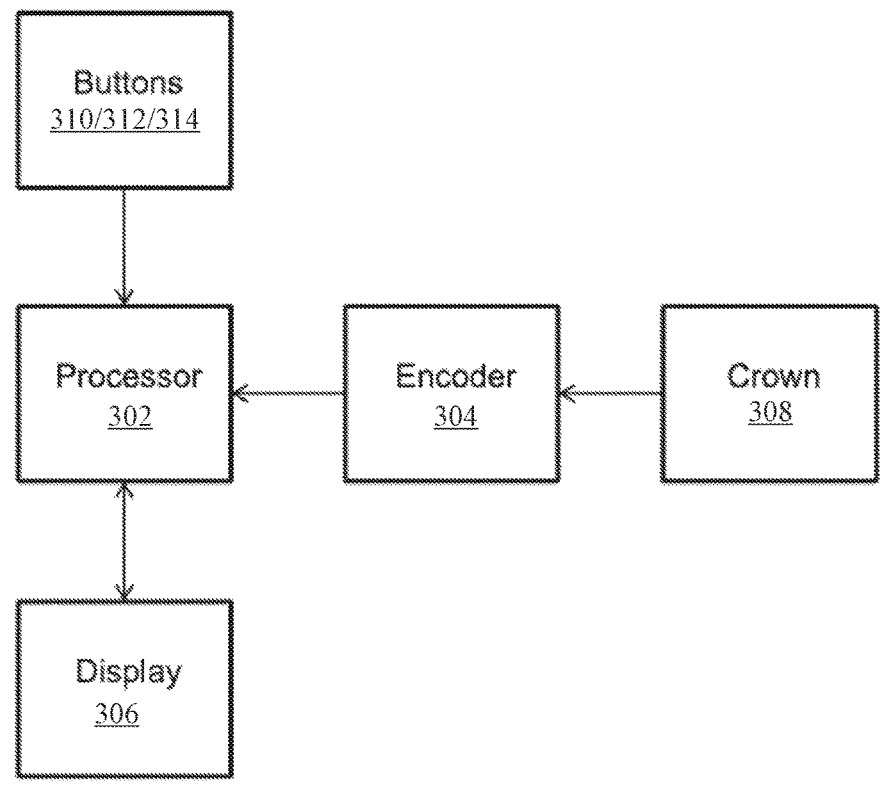
FIG. 3 illustrates an exemplary block diagram of components within an exemplary device according to examples of the disclosure

FIG. 3 illustrates an exemplary block diagram of components within an exemplary device 300 according to examples of the disclosure. In some examples, crown 308 (which can correspond to crown 208 described above) can be coupled to encoder 304, which can be configured to monitor a physical state or change of physical state of the crown (e.g., the position and/or rotational state of the crown), convert it to an electrical signal (e.g., convert it to an analog or digital signal representation of the position or change in position of the crown), and provide the signal to processor 302. For instance, in some examples, encoder 304 can be configured to sense the absolute rotational position (e.g., an angle between 0-360°) of crown 308 and output an analog or digital representation of this position to processor 302. Alternatively, in other examples, encoder 304 can be configured to sense a change in rotational position (e.g., a change in rotational angle) of crown 308 over some sampling period and to output an analog or digital representation of the sensed change to processor 302. In these examples, the crown position information can further indicate a direction of rotation of the crown 308 (e.g., a positive value can correspond to one direction and a negative value can correspond to the other). In yet other examples, encoder 304 can be configured to detect a rotation of crown 308 in any desired manner (e.g., velocity, acceleration, or the like) and can provide the crown rotational information to processor 302. The rotational velocity can be expressed in numerous ways. For example, the rotational velocity can be expressed as a direction and a speed of rotation, such as hertz, as rotations per unit of time, as rotations per frame, as revolutions per unit of time, as revolutions per frame, as a change in angle per unit of time, and the like. In alternative examples, instead of providing information to processor 302, this information can be provided to other components of device 300, such as, for example, a state machine. It should be understood that the encoder 304 can detect the physical state of the crown 308 by optical (described in more detail below), mechanical, capacitive, or magnetic sensing techniques, or combinations of two or more of the above techniques as well as analogous techniques for detecting a rotational position of a rotatable object. In some examples, the rotational position of the crown 308 can be determined by one or more position landmarks, such as protrusions, surface features, optically detectable patterns or markings (e.g., a collection of light and dark lines as described below), magnets and/or capacitive coupling electrodes. While the examples described herein refer to the use of rotational position of crown 308 to control scrolling or scaling of a view, it should be appreciated that any other physical state of the crown can be used to control appropriate actions.

In some examples, the state of the display 306 (which can correspond to display 206 described above) can control physical attributes of crown 308. For example, if display 306 shows a cursor at the end of a scrollable list, crown 308 can have limited motion (e.g. cannot be rotated forward). In other words, the physical attributes of the crown 308 can be conformed to a state of a user interface that is displayed on display 306. The mechanisms for controlling the physical attributes of the crown are described in further detail below. In some examples, a temporal attribute of the physical state of crown 308 can be used as an input to device 300. For example, a fast change in physical state can be interpreted differently than a slow change in physical state. These temporal attributes can also be used as inputs to control physical attributes of the crown.

Processor 302 can be further coupled to receive input signals from buttons 310, 312, and 314 (which can correspond to buttons 210, 212, and 214 above, respectively), along with touch signals from touch-sensitive display 306. Processor 302 can be configured to interpret these input signals and output appropriate display signals to cause an image to be produced by touch-sensitive display 306. While a single processor 302 is shown, it should be appreciated that any number of processors or other computational devices can be used to perform the functions described above.

Figure 4:
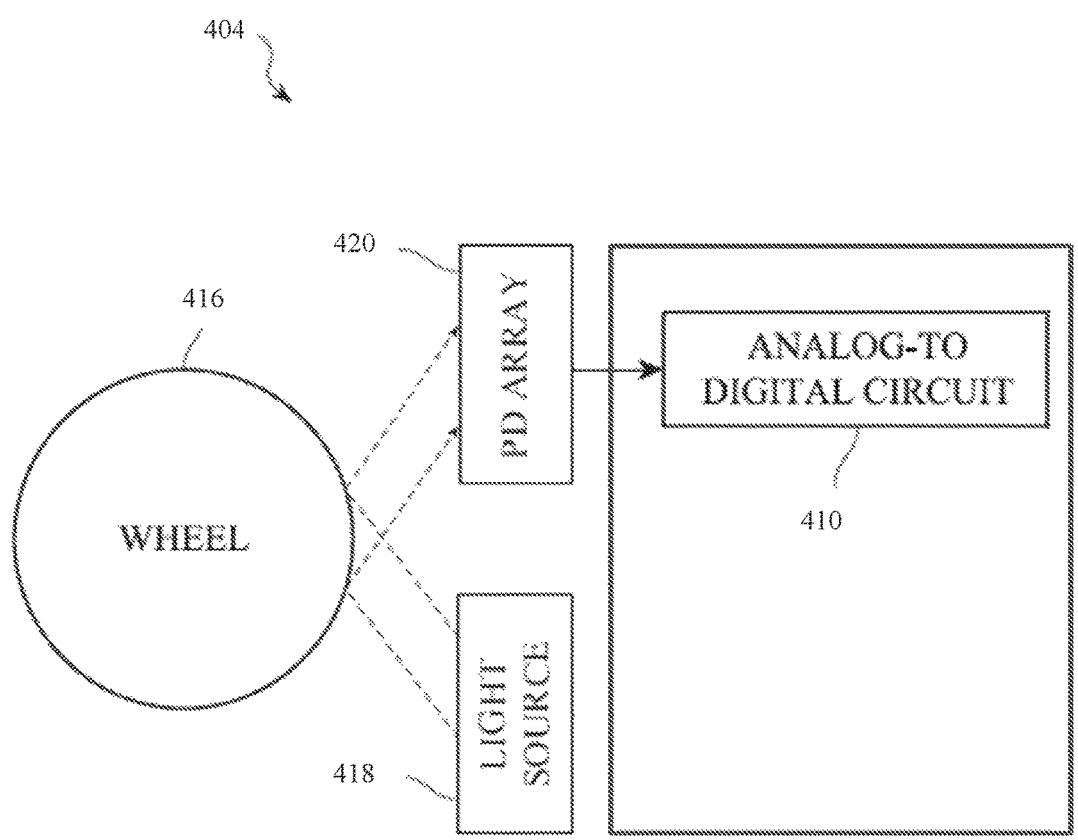
FIG. 4 illustrates an exemplary block diagram of various components of an optical encoder that can be used to receive crown position information according to examples of the disclosure.

FIG. 4 illustrates an exemplary block diagram of various components of an optical encoder 404 that can be used to receive crown position information according to examples of the disclosure. The optical encoder 404 shown in FIG. 4 may correspond to the encoder 304 described above, or may be used in conjunction with the encoder 304 described above. In various electronic devices, rotational and/or axial movement of a component (e.g., a crown) of the electronic device may need to be determined. In such instances, an optical encoder 404 may be used to detect the rotational movement and the axial movement of the component. For example, an optical encoder 404 according to examples of the disclosure can include a light source 418 that shines on a wheel 416 (also referred to as an encoder wheel) or a shaft of the optical encoder. The wheel 416 (or shaft) may include an encoding pattern, such as, for example, a collection of light and dark lines that are arranged in a particular sequence or in a particular pattern. In some examples, the wheel 416 may be integrated with or attached by a shaft to the crown 208 described above.

When light from the light source 418 hits the encoding pattern, the encoding pattern can modulate the light and reflect it onto one or more sensors 420 associated with the optical encoder. In certain examples, the one or more sensors 420 may be an array of photodiodes (PD). As light from the light source 418 is reflected off the wheel 416, one or more photodiodes of the photodiode array 420 can produce a voltage measurement associated with an amount of light received at a given sample time. Once the light is received by the photodiode array 420 at a given time period, an analog-to-digital circuit 410 can convert the analog signal received from the photodiode array to a digital signal. The corresponding digital signals can be processed, and a determination may be made as to the direction, speed and/or movement (rotational and/or axial) of the wheel. In some examples, the direction and/or speed of the rotation information can be used in combination with the haptic feedback mechanisms described in the disclosure to improve interactivity of the user experience. For example, as the user rotates the crown, the haptic feedback circuit can provide a small movement of the crown. This movement can provide the user with a "click-click-click" feeling of winding a mechanical watch, for example, and will be described in more detail below.

Figure 5:
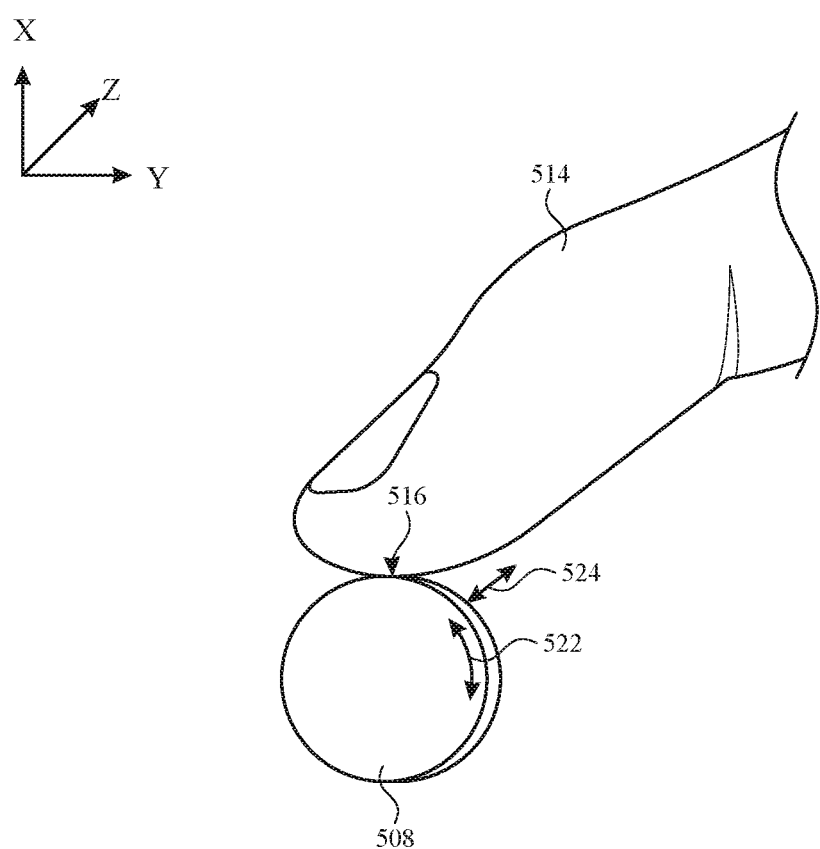
FIG. 5 illustrates an exemplary finger interacting with a protruding rotary input according to examples of the disclosure.

FIG. 5 illustrates an exemplary finger 514 interacting with a protruding rotary input 508 according to examples of the disclosure. FIG. 5 further depicts an exemplary rotary input 508 (which can correspond to crown 208 and/or rotating bezel above) that can rotate in rotational direction 522 as well as be displaced in direction 524, i.e. translated along the direction of the rotation axis (e.g., z-axis) toward and/or away from a device (e.g., device 100 above), according to examples of the disclosure. In some examples, it can be beneficial to provide haptic or tactile feedback to a user interacting with a device (e.g., providing a mechanical input to the device), to give the user a richer interaction experience with the device. Finger 514 can be resting on rotary input 508, and can be providing rotational input to the rotary input in rotational direction 522. In addition to being able to rotate in rotational direction 522, rotary 508 input can also have the ability to be displaced along direction 524, (corresponding to movement along the z-axis in FIG. 4), orthogonal to rotational direction 522 and the movement of finger 514. In some examples, displacement or translation along direction 524 can be used to activate a translational input (e.g. pushing the rotary input inward along direction 524 can activate a button input or pressure sensitive input). In some examples, the translational input can be activated when a translational input component is compressed. In some examples, rotary input 508 can be displaced by an actuator in direction 524 orthogonal to the rotational input provided by finger 514. Examples of these actuators and their operation are described in further detail below. The displacement of rotary input in the direction 524 can cause stretching and/or compression of portion 516 of finger 514 that is touching rotary input 508, and can simulate the feeling of a ridge or detent (e.g., the clicking of a rotary input) associated with the rotary input. In some examples, limiting the displacement of rotary input 508 along the direction 524 to be a relatively small displacement (e.g., 1 mm or less) can be most effective in simulating the above ridges or detents. In some examples, providing the displacement of rotary input 508 along the direction 524 for a relatively short duration (e.g., 100 milliseconds or less) can be most effective in simulating the above ridges or detents. The speed, duration, strength, density and any other characteristic of the displacement of rotary input 508 along direction 524 can be adjusted dynamically to provide a range of haptic feedback to the user, from continuous texture-like sensations to individual clicks or ridges on the rotary input to no haptic feedback at all to allow a smooth rotation of the rotary input. Alternatively, rotation of rotary input 508 can be resisted, for example by providing a sustained displacement along the direction 524 causing an increase in the amount of friction resisting rotation of the rotary input. Additionally, while the examples of the disclosure are provided in the context of a rotary input, the examples of the disclosure can analogously be implemented in the context of other mechanical inputs, such as a slider that slides along a first direction and is displaced along a second, orthogonal direction, and can be implemented in the context of non-mechanical inputs (e.g., inputs provided via a touch-sensitive surface), to provide haptic feedback to a user.

Figure 6:
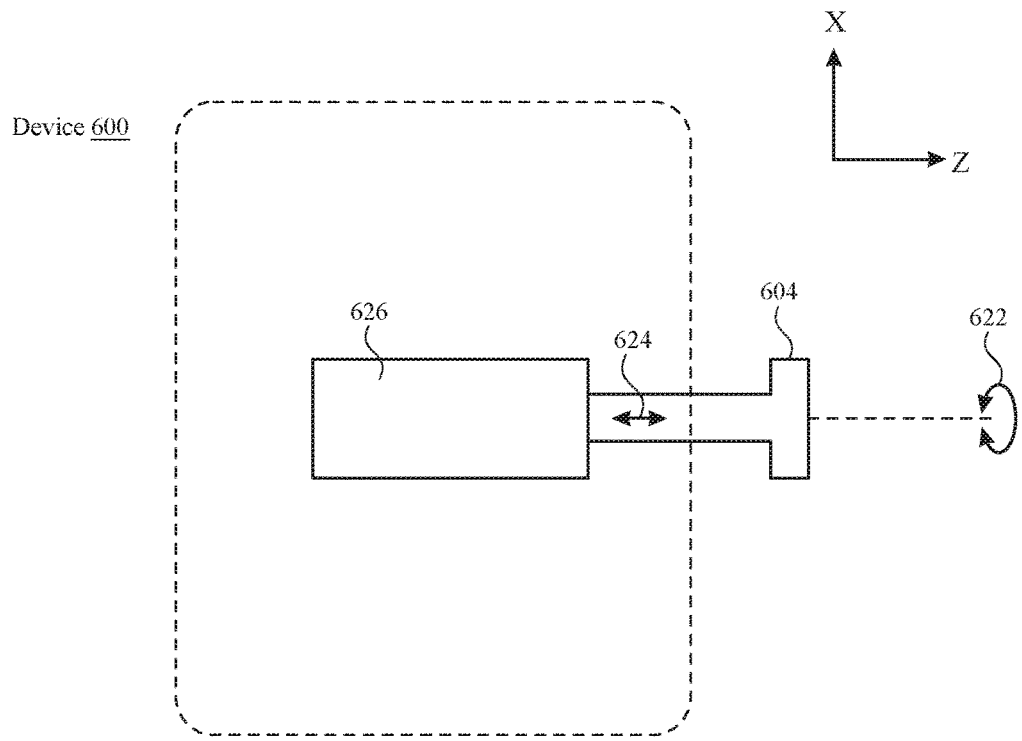
FIG. 6 illustrates an exemplary device including a mechanical input sensor and a mechanical input actuator according to examples of the disclosure.

FIG. 6 illustrates exemplary device 600 including rotary input 604 (which can correspond to crown 208 above) that can be rotated along rotational direction 622 and displaced along direction 624 orthogonal to the rotational direction according to examples of this disclosure. In some examples, device 600 can include rotary input 604 to provide various input functionalities such as to increase or decrease a volume output of the device, scroll up/down through content displayed on the device, and/or zoom into/out of content displayed on the device, for example; other functionalities are similarly contemplated. Rotary input 604 can be coupled to mechanical input sensor and actuator 626 in device 600, which can both sense the rotational movement of the rotary input along rotational direction 622, and provide displacement of the rotary input along direction 624. In some examples, mechanical input sensor and actuator 626 can also detect displacement of the rotary input 604 along direction 624. Mechanical input sensor and actuator 626 can be programmable, such that any number of characteristics of the displacement of rotary input 604 along direction 624 can be adjusted, as desired. For example, the amplitude of the displacement, the duration of the displacement, the frequency of the displacement (e.g., every 30 degrees of rotation), the velocity of the displacement, and any other characteristic of the displacement can be dynamically varied to provide the desired user experience on device 600.

In some examples, the characteristics of the displacement of rotary input 604 along direction 624 can be based on the context of device 600. For example, if device 600 is running and displaying a mapping application, rotary input 604 can be used to zoom into and out of a displayed map. In such circumstances, mechanical input sensor and actuator 626 can provide a linear displacement of rotary input 604 along direction 624 each time the scale of the map is changed in response to the rotational input of the rotary input (e.g., switching from a five-mile scale to a one-mile scale), so as to simulate a click of the rotary input (e.g., a detent) and to provide the user haptic feedback that the scale of the map has been changed.

As another example, if device 600 is running and displaying a timing application, rotary input 604 can be used to set the duration of a timer. In such circumstances, mechanical input sensor and actuator 626 can provide a linear displacement of rotary input 604 along direction 624 each time the duration of the timer is changed by a predetermined amount (e.g., every minute, every five minutes, etc.) in response to the rotational input of the rotary input, so as to simulate a click of the rotary input (e.g., a detent) and to provide the user haptic feedback that the duration of the timer has been changed by a predetermined amount. Other circumstances in which the characteristics of the displacement of rotary input 604 along direction 624 can be based on the context of device 600 (e.g., the current state of the device, what application(s) are running on the device, what user interface(s) are being displayed on the device, etc.) are similarly within the scope of the disclosure. In non-mechanical examples, element 626 can be an actuator responsive to signals from a touch controller (not shown) indicating that a certain type of touch input is being detected (e.g., rotational or circular touch inputs). In these examples, the actuator may provide haptic feedback to the entire device, or may provide localized haptic feedback if permitted by the structural elements of the device.

Figure 7:
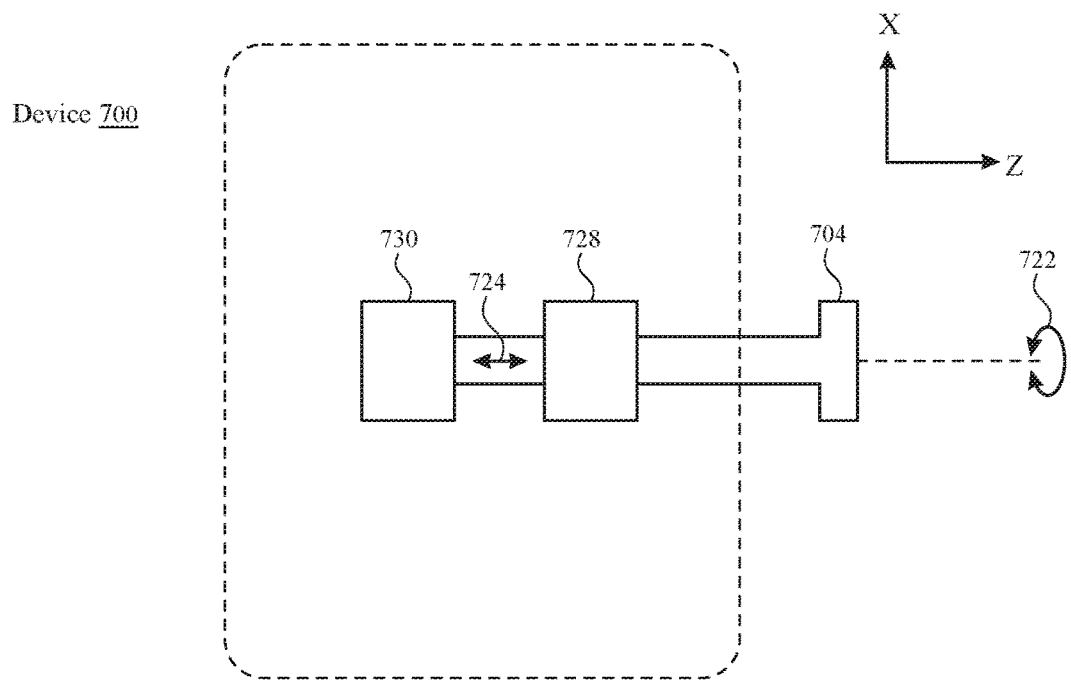
FIG. 7 illustrates alternative exemplary device including a mechanical input sensor and a mechanical input actuator according to examples of the disclosure

FIG. 7 illustrates alternative exemplary device 700 including mechanical input sensor 728 (which can correspond to encoder 304 above) and mechanical input actuator 730 according to examples of the disclosure. Instead of single mechanical input sensor and actuator 626 in FIG. 6, device 700 can include a separate mechanical input sensor 728 and a separate mechanical input actuator 730. Mechanical input sensor 728 can be coupled to rotary input 704 (which can correspond to crown 208 above) and can sense the rotational movement of the rotary input along rotational direction 722. In some examples, mechanical input sensor 728 can also detect displacement of the rotary input 704 along direction 724. Mechanical input actuator 730 can be coupled to mechanical input sensor 728 and can provide displacement of mechanical input sensor 728, and thus rotary input 704, along direction 724. Mechanical input actuator 730 can be in communication with mechanical input sensor 728 such that the mechanical input actuator can have access to the input information provided by rotation of rotary input 704. Mechanical input actuator 730 and/or mechanical input sensor 728 can be programmable such that any number of characteristics of the displacement of rotary input 704 along direction 724 can be adjusted, as discussed above with respect to FIG. 6.

Figure 8:
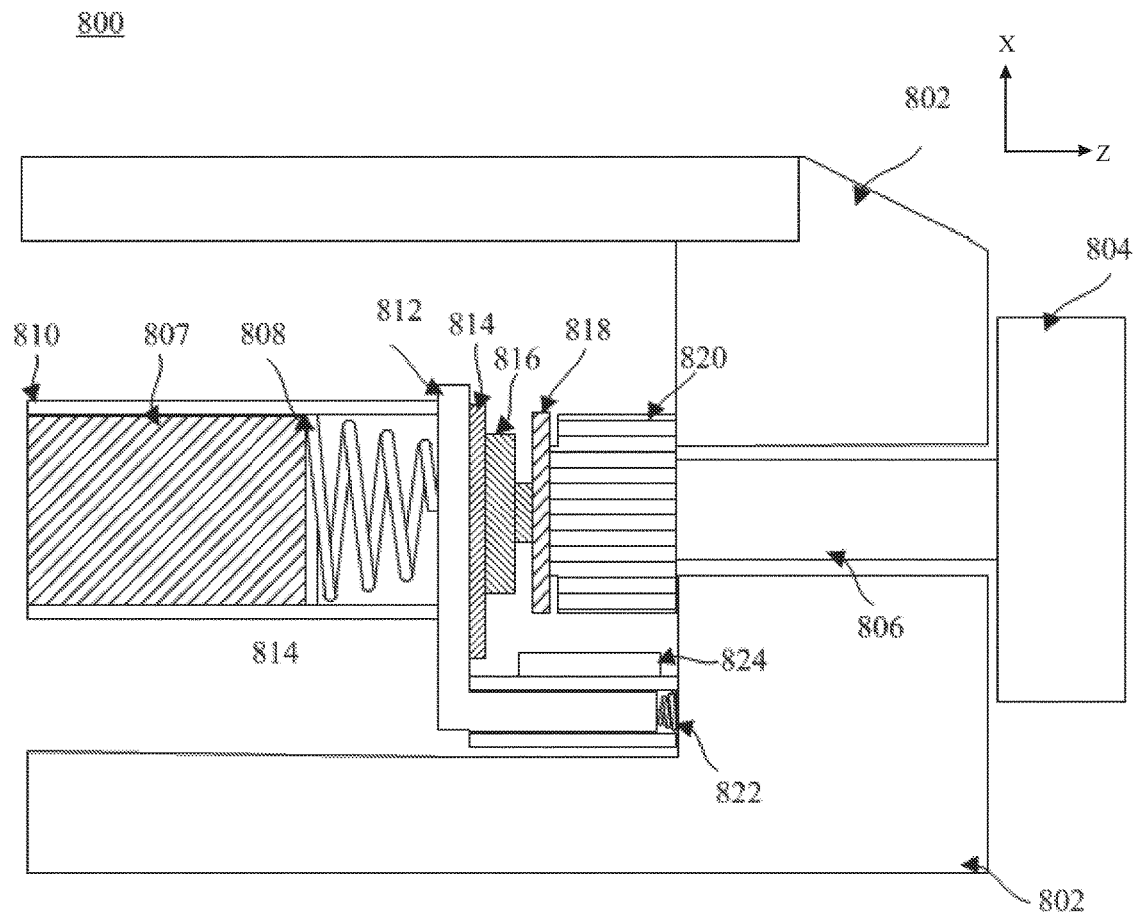
FIG. 8 illustrates an exemplary haptic feedback mass implementation of a haptic feedback arrangement according to examples of the disclosure.

FIG. 8 illustrates an exemplary haptic feedback mass arrangement for providing haptic feedback to a crown 804 of device 800 according to examples of the disclosure. In some examples, crown 804 (which can correspond to crown 208 above) can be coupled by shaft 806 to an encoder wheel 820 (which can correspond to wheel 416 above) that can be used for detecting rotation of the crown as described above in FIG. 4. The combination of the crown 804, the shaft 806, and the encoder wheel 820 will be referred to as the "crown assembly" hereafter. The shaft 806 can pass through an opening in housing 802 and can be rotatable within the opening. In some examples, encoder 824 (which can correspond to encoder 304 above) can be used to detect rotation of the crown 804 as described above. In some examples, shear plate 818 can be located at a distal end of the crown assembly and can be in contact with an edge of the encoder wheel 820. In some examples, shear plate 818 can be built from and/or coated with a durable material for providing wear resistance as the crown assembly (e.g., the encoder wheel 820 edge) rotates and rubs against the shear plate. In some examples, a mounting plate 812 can be operatively coupled to housing 802 of the device. In some examples, the mounting plate 812 can be used for mounting components internal to the housing. In some examples, flex connector 814 can be coupled to the mounting plate 812 for providing electrical connections to internal circuitry of the device 800. In some examples, movement of the crown 804 (e.g., by a user's touch) in the z-axis direction can move the crown assembly and shear plate toward the push-button 816 (e.g., in the negative z-axis direction) until the push-button depresses. In some examples, push-button 816 can be coupled to the flex connector 814 and in some examples, the push-button, when depressed, can create electrical contact between traces on the flex connector 814. Although a push-button is described in connection with the present example, it is understood that a variety of pressure sensitive components can be used to detect movement of the crown assembly due to force applied to the crown 804 along the z-axis.

In some examples, device 800 can be configured to provide haptic feedback to a user based on the user's interaction with the device (as described in more detail above). In some examples, device 800 can include a haptic feedback mass 807, which can be coupled to a spring 808 (or multiple springs positioned on different sides of the haptic feedback mass). In some examples, the spring 808 and haptic feedback mass 708 can be located within an enclosure 810 in the device. In some examples, enclosure 810 can constrain the haptic feedback mass 807 to move along only one axis of motion. For example, the haptic feedback mass 807 could be constrained to move only the direction of compression of the spring 808 as illustrated (e.g., the z-axis direction in FIG. 5). In other examples, multiple springs 808 and a different enclosure 810 shapes could allow movement of the haptic feedback mass 807 in multiple directions. In some examples, the haptic feedback mass 807 can be driven to move (e.g., physically, magnetically, etc.) and the movement of the haptic feedback mass can move the device 800 to provide a sensation of movement of the device to a user holding or wearing the device. In some examples, the crown assembly can be coupled to the haptic feedback mass 807 by having coupling spring 808 in contact with the mounting plate 812 (e.g., placing spring 808 in contact with the mounting plate as illustrated). In some examples, mounting plate 812 can be movable over a range of motion in the z-axis direction, and movement of the mounting plate can transfer to the crown assembly through the stack up of components between the mounting plate and the crown assembly (e.g., components 814, 816, and 818). Accordingly, in some examples, movement of the haptic feedback mass 807 can be configured to result in movement of the crown 804 (e.g., toward and away from the housing 802). In some examples, a housing spring 822 can be positioned between the device housing 802 and the mounting plate 812 crown assembly for providing a counter spring force to movement of the crown assembly induced by the haptic feedback mass 807. In another example (not illustrated), the housing spring 822 can instead be placed between the housing 802 and the edge of the encoder wheel 820 facing the housing to achieve a counter spring force (e.g., a ring shaped spring surrounding shaft 806).

In some examples, housing spring 822 can have a variable stiffness, such that the coupling between the crown assembly and the haptic feedback mass 807 can be adjustable. In some examples, when the housing spring 822 is configured with a high stiffness, the housing spring can prevent movement of the haptic feedback mass 807 transferring into movement of the crown 804 (e.g., by stiffening the mounting plate 812, and/or the crown assembly). In some examples, when the housing spring 822 is configured with a low stiffness, the movement of the haptic feedback mass 807 can transfer into movement of the crown 804. Although one arrangement for housing spring 822 is illustrated and another alternative is described above, it is understood that the housing spring can be placed in many different locations while performing the same functions. In addition, while an implementation is described where a high stiffness of housing spring 822 can prevent movement of the crown and a low stiffness of the housing spring can allow movement, an opposite arrangement (e.g., crown allowed to move in high stiffness state) is also possible. For example, by placing the housing spring 822 between the haptic feedback mass 807 and the crown assembly, the housing spring can transfer movement of the haptic feedback mass to the crown assembly when the housing spring has a high stiffness. Further, while FIG. 8 illustrates the springs 808 and 822 as coil or helical springs, it is understood that other types of springs (e.g., clock springs, tension springs, leaf springs, variable stiffness actuators, etc.) can be used. Furthermore, more than one spring can be used to perform the functions of springs 808 and/or 822 described above. For example, multiple housing springs 822 can be used to maintain a more uniform positioning of the crown assembly relative to the housing.

FIGS. 9A-9B illustrate an exemplary piezoelectric implementation for providing a haptic feedback arrangement to a crown assembly including crown 904 (which can correspond to the crown assembly including crown 804 above) of device 900 (which can correspond to device 800 above) according to examples of the disclosure. FIG. 9A illustrates a side view of a portion of the device 900 that can be used for implementing the haptic feedback arrangement. Similar to the crown assembly of FIG. 8, the combination of the crown 904, shaft 906, and encoder wheel 920 will be referred to as the "crown assembly" hereafter. In some examples, crown 904 can be attached to rotatable shaft 906 (which can correspond to shaft 806 above). In some examples, the shaft 906 can pass through an opening in housing 902 (which can correspond to housing 802 above) of the device 900. In some examples, shaft 906 can be attached to an encoder wheel 920 (which can correspond to wheel 416 above) on the inside of the housing 902. In some examples, a mounting plate 910 (which can correspond to mounting plate 812 above) can be coupled to housing 902. In some examples, mounting plate 910 can be coupled to a flex connector 912 (which can correspond to flex connector 814 above) for providing electrical connections to internal circuitry of the device 900. In some examples, an additional flex tail 914 can extend from the flex connector 912 for providing electrical connections to a piezoelectric element 922 located apart from the mounting plate 910.

In some examples, the piezoelectric element 922 (which can correspond to mechanical input actuator 726 above) can be disposed between housing 902 and the encoder wheel 920. In some examples, piezoelectric element 922 can be formed as a ring shaped piezoelectric element having a central opening that allows the shaft 906 to pass through the center of the ring. In some examples, piezoelectric element 922 can be formed from multiple piezoelectric element segments formed into a ring shape that can similarly allow the shaft 906 to pass through. In some examples, piezoelectric element 922 can be fixedly attached to the housing 902. An exemplary stack up for the piezoelectric element 922 is illustrated in FIG. 9B and described below. In some examples, when a voltage is applied to the piezoelectric element, the piezoelectric element can expand and/or contract to create movement of the crown assembly along the z-axis direction (i.e., toward and away from the housing 902). In some examples, this movement of the crown assembly by piezoelectric element 922 can be used to provide haptic feedback (e.g., a detent) to a user as described above. In some examples, shear plate 918 (which can correspond to shear plate 818 above) can be located at a distal end of the crown assembly and can be in contact with an edge of the encoder wheel 920. In some examples, shear plate 918 can be built from and/or coated with a durable material for providing wear resistance as the crown assembly rotates and rubs against the shear plate. In some examples, shear plate 918 can also provide a backing force (e.g., preloading) to help keep the desired position of crown 904. In some examples, the shear plate 918 can be moveable such that the shear plate can comply with movement of the crown assembly in the z-axis direction. In some examples, a switch 916 can be positioned behind the shear plate. In some examples, movement of the crown assembly (e.g., by a user's touch) in the z-axis direction can move the crown assembly and shear plate 918 toward the push-button 916 until the push-button depresses. In some examples, the push-button 916 can include a spring that can provide a mechanical and/or audible sensation to a user indicating a push-button press. In some examples, actuation of the push-button may not result in any sensation to the user. In some examples, the piezoelectric element 922 can be used to provide haptic feedback to the user when the push-button 916 is actuated.

FIG. 9B illustrates an exemplary stack up for mechanically attaching and providing electrical connections for the piezoelectric element 922 to the housing 902 of device 900 according to examples of the disclosure. In some examples, one side of piezoelectric element 922 can be attached to flex tail 914 for providing electrical connections to electrodes of the piezoelectric element. In some examples, when a voltage is applied to the piezoelectric element 922, the piezoelectric element can change in size and/or shape. In some examples, flex tail 914 can be coupled by an adhesive layer 926 to the housing 902 of the device. In some examples, a stiffening layer (not shown) can be added to increase rigidity of the flex tail and piezoelectric element 922 assembly. Although adhesive layer 926 is illustrated attaching directly to housing 902 in FIG. 9B, other variations where the flex tail 914 is adhesively coupled to another component (e.g., a nut) coupled to the housing are within the scope of the present disclosure. In some examples, a durable coating 928 (e.g., diamond-like carbon) can be disposed on the surface of the piezoelectric element 922 that rubs against the edge of the encoder wheel 920 when the crown (e.g., crown 904 above) is rotated. This durable coating 928 can increase the wear resistance of the piezoelectric element 922. In addition, if the coating 928 has a low coefficient of friction, the coating can also reduce shearing forces applied to the piezoelectric element 922 resulting from contact with the rotating encoder wheel 920. Further, each time the piezoelectric element 922 is expanded and contracted by application of a voltage to its electrodes, there can be slight variations in the shape of the piezoelectric electrode. In some examples, these variations can induce a tilt in the encoder wheel 920 that can affect the readings of rotation of the crown assembly by the encoder 924 (shown above). In some examples, the encoder 924 and/or a processor can be configured to compensate for the variations resulting from such a tilt.

Figure 10:
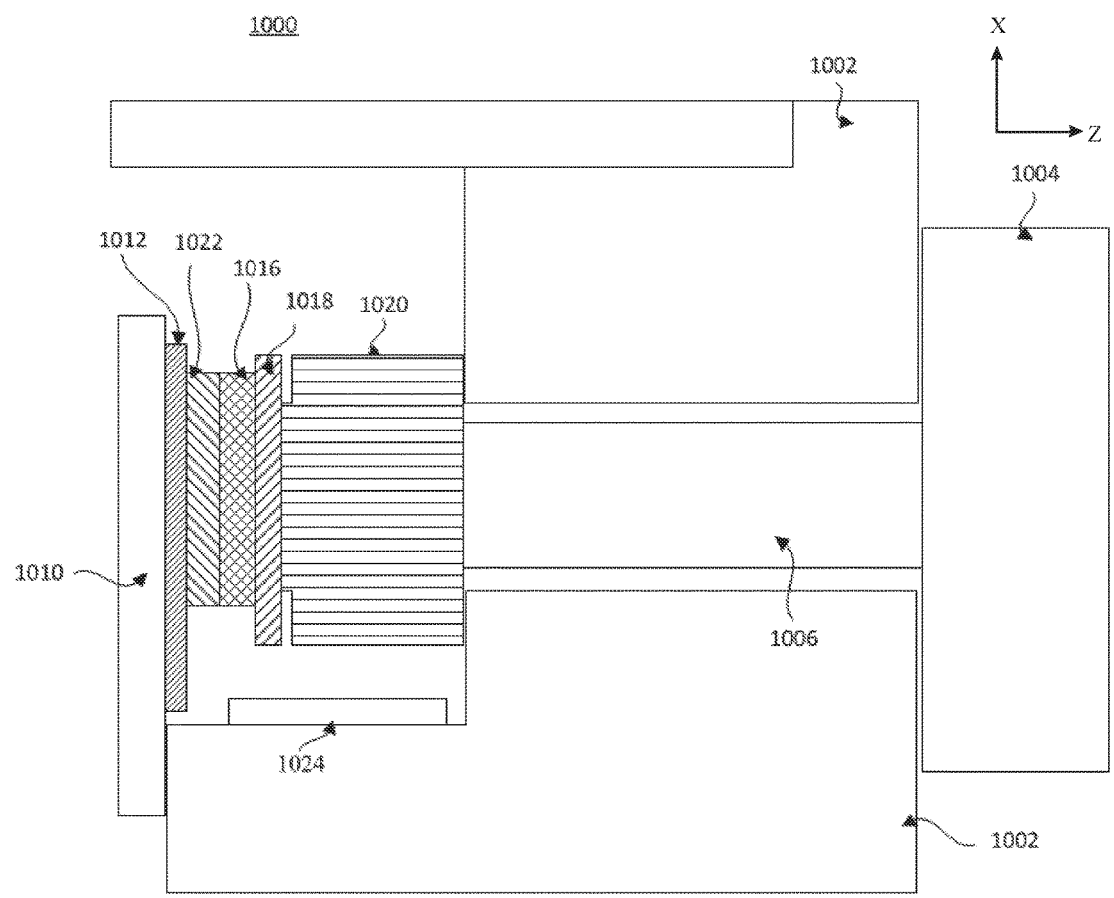
FIG. 10 illustrates an alternative exemplary piezoelectric implementation of a haptic feedback arrangement according to examples of the disclosure.

FIG. 10 illustrates an alternative exemplary piezoelectric implementation of a haptic feedback arrangement for providing haptic feedback to a crown 1004 (which can correspond to crown 804 above). Housing 1002, crown 1004, shaft 1006, mounting plate 1010, flex connector 1012, shear plate 1018, encoder wheel 1020 each can have corresponding similarly named components described in FIGS. 8 and 9A. In some examples, piezoelectric element 1022 (which can correspond to piezoelectric element 922 above) can be coupled to flex connector 1012 (which can correspond to flex connector 912 above) which can in turn be coupled to mounting plate 1010. In some examples, a pressure sensitive element 1016 can be disposed between the piezoelectric element 1022 and a shear plate 1018. In some examples, pressure sensitive element 1016 can be a capacitive sensor. In some examples, a force applied to the pressure sensitive element 1016 can result in a change in capacitance that can be measured and used to determine the amount of applied force. In some examples, the pressure sensitive element 1016 can be a parallel plate capacitance sensor having a compressible gap between two parallel plates. In this example, when pressure is applied to the pressure sensitive element 1016 (e.g., when a user presses on the crown), the pressure sensitive element can be compressed, causing change in the capacitance value that can correspond to the amount of pressure being applied. In some examples, the pressure sensitive element 1016 can be built from multiple sub-elements (not shown) to obtain additional information about the force applied, such as a direction of the force. In some examples, the direction of force can be calculated by comparing force measurements determined from the sub-elements of pressure sensitive element 1016.

In some examples, the pressure sensitive element 1016 can replace and improve upon the functionality of push-button 916 above for providing a user input actuated by pressing the crown 1004 in toward the housing. In some examples, the pressure sensitive element 1016 can add further functionality by utilizing measured force information to enhance a user's experience. For example, device 1000 can perform a first function when a light press on the crown 1004 is detected and a different function when a strong press on the crown is detected. In some examples, the device can utilize the pressure sensitive element 1016 to differentiate between presses by the user of varying durations, intensities, and/or velocities to provide different types of inputs for the user. In some examples, a larger and/or more intense displacement of the crown 1004 by the piezoelectric element 1022 may be required for a user to feel the detent. For example, if the user is touching the crown 1004 very lightly, a small movement of the crown may not be noticeable. In some examples, a smaller and/or less intense displacement of the crown 1004 by the piezoelectric element 1022 may be required for a user to feel the detent. For example, if the user is touching the crown 1004 with a large amount of force along the z-axis, the user may recognize a relatively small movement in the crown. In some examples, the amount of force detected by pressure sensitive element 1016 can be used to vary the characteristics (e.g., amplitude, duration, and/or velocity) of the force applied by piezoelectric element 1022 for providing a variable detent feedback to the user.

In some examples, the piezoelectric element 1022 can perform some or all of the functions of the pressure sensitive element 1016 above. In some examples, when the piezoelectric element 1022 is compressed (e.g., when a user presses on the crown), a voltage can be generated across the piezoelectric element. In some examples, the voltage can be used to determine an amount of force applied to the crown 1004, similar to the operation of the pressure sensitive element 1016 above. As described above, the piezoelectric element 1022 can be divided into multiple sub-elements for determining additional information about force applied to crown 1004 (e.g., the direction of the force). As described above, a piezoelectric element 1022 can also be driven with a voltage to change its size and/or shape for providing haptic feedback to a user. In some examples device 1000 can be configured to determine the amount of force applied to the piezoelectric element 1022 based on the voltage across the piezoelectric element when the piezoelectric element is not being driven. In some examples, a time division multiplex-ing technique can be used to alternate between pressure sensing functionality and haptic feedback functionality of the piezoelectric element 1022. Accordingly, the present disclosure illustrates a multitude of configurations for providing haptic feedback to a user.

Figure 11:
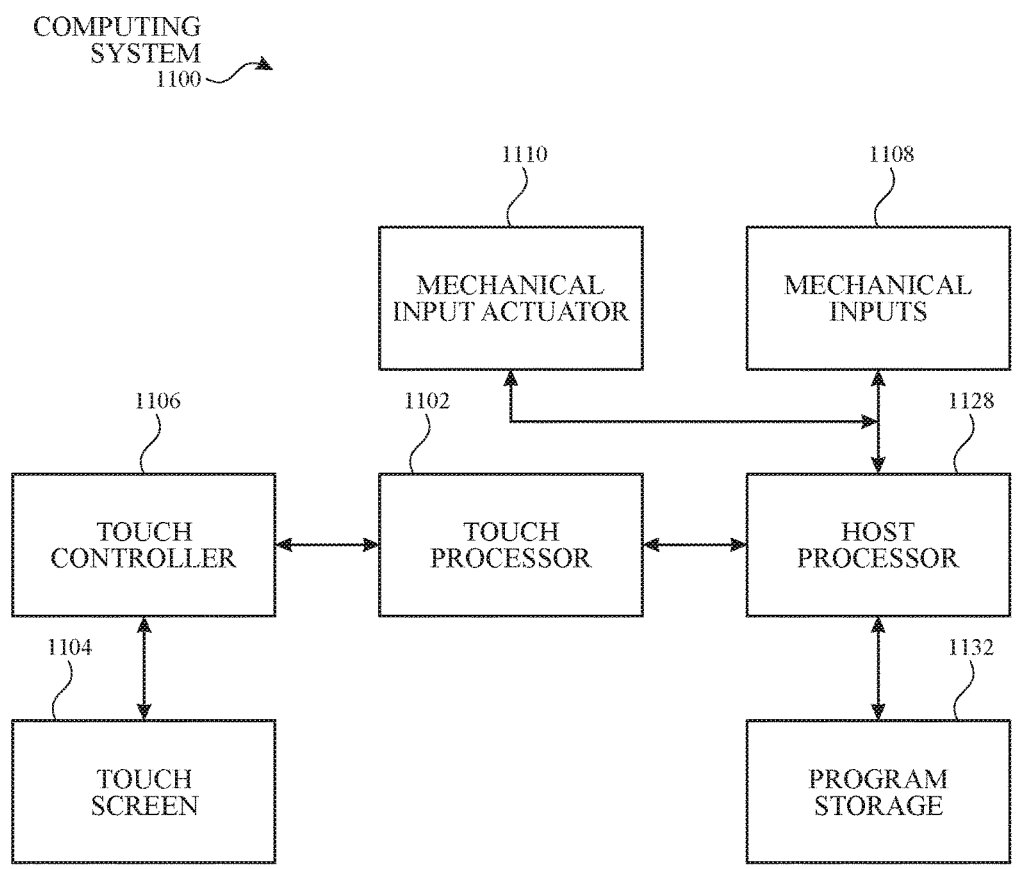
FIG. 11 illustrates an example computing system for implementing mechanical input displacement according to examples of the disclosure.

FIG. 11 illustrates an example computing system 1100 for implementing the mechanical input displacement according to examples of the disclosure. Computing system 1100 can be included in, for example, mobile telephone 136, media player 140, watch 144 or any mobile or non-mobile computing device and/or wearable device that includes an input mechanism (e.g., crown 208). Computing system 1100 can include a touch sensing system including one or more touch processors 1102, touch controller 1106 and touch screen 1104. Touch screen 1104 can be a touch screen adapted to sense touch inputs, as described in this disclosure. Touch controller 1106 can include circuitry and/or logic configured to sense touch inputs on touch screen 1104. In some examples, touch controller 1106 and touch processor 1102 can be integrated into a single application specific integrated circuit (ASIC).

Computing system 1100 can also include host processor 1128 for receiving outputs from touch processor 1102 and performing actions based on the outputs. Host processor 1128 can be connected to program storage 1132. For example, host processor 1128 can contribute to generating an image on touch screen 1104 (e.g., by controlling a display controller to display an image of a user interface (UI) on the touch screen), and can use touch processor 1102 and touch controller 1106 to detect one or more touches on or near touch screen 1104. Host processor 1128 can also contribute to sensing and/or processing mechanical inputs 1108 (e.g., crown 208 or a rotating bezel), and controlling mechanical input actuator 1110 (e.g., crown displacement, haptic feedback, or a detent), as described in this disclosure. The touch inputs from touch screen 1104 and/or mechanical inputs 1108 can be used by computer programs stored in program storage 1132 to perform actions in response to the touch and/or mechanical inputs. For example, touch inputs can be used by computer programs stored in program storage 1132 to perform actions that can include moving an object such as a cursor or pointer, scrolling or panning, adjusting control settings, opening a file or document, viewing a menu, making a selection, executing instructions, operating a peripheral device connected to the host device, answering a telephone call, placing a telephone call, and other actions that can be performed in response to touch inputs. Mechanical inputs 1108 can be used by computer programs stored in program storage 1132 to perform actions that can include changing a volume level, locking the touch screen, turning on the touch screen, taking a picture, and other actions that can be performed in response to mechanical inputs. Host processor 1128 can cause displacement of mechanical inputs 1108 by mechanical input actuator 1110 based on the mechanical inputs and/or the context of computing system 1100 (e.g., what application(s) are running on the computing system, what user interface(s) are displayed by the computing system, etc.), as previously described. Host processor 1128 can also perform additional functions that may not be related to touch and/or mechanical input processing.

Note that one or more of the functions described above can be performed by firmware stored in memory in computing system 1100 and executed by touch processor 1102, or stored in program storage 1132 and executed by host processor 1128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Thus, the examples of the disclosure provide various ways to provide haptic feedback to a user by displacing a mechanical input in one direction to simulate a haptic feature in another direction.

Therefore, according to the above, some examples of the disclosure are directed to an electronic device comprising a housing, an input mechanism cooperatively engaged with the housing and configured to rotate in a first direction about a rotation axis, an input sensor configured to sense an input at the input mechanism based on rotation of the input mechanism, and an actuator coupled to the housing and configured to displace the input mechanism in a direction orthogonal to the rotation axis of the input mechanism, and a force sensor coupled to the input mechanism and configured to sense an input at the input mechanism based on a force applied to the input mechanism along the direction orthogonal to the axis of rotation. Additionally or alternatively to one or more of the examples disclosed above, in some examples, the electronic device further comprises: a position landmark proximate to one distal end of the input mechanism, wherein the input sensor is configured to determine rotation of the input mechanism based on the position landmark, and the actuator is configured to displace the input mechanism by applying a force along the direction orthogonal to the axis of rotation of the input mechanism. Additionally or alternatively to one or more of the examples disclosed above, in some examples, the force sensor is a mechanical switch. Additionally or alternatively to one or more of the examples disclosed above, in some examples, the mechanical input actuator is configured to apply the force to contact the input mechanism in a position different from the distal ends of the input mechanism. Additionally or alternatively to one or more of the examples disclosed above, in some examples, the force sensor is located at a distal end of the input mechanism. Additionally or alternatively to one or more of the examples disclosed above, in some examples, the actuator and the force sensor are positioned at a same distal end of the input mechanism.

Some examples of the disclosure are directed to an electronic device comprising a housing, a haptic feedback mass coupled to the housing, the mass configured for generating movement of the housing, an input mechanism cooperatively engaged with the housing and rotatable about a first axis, wherein the input mechanism is configured to have a variable amount of coupling to movement of the haptic feedback mass. Additionally or alternatively to one or more of the examples disclosed above, in some examples, varying the variable amount of coupling comprises adjusting a stiffness of a variable stiffness element configured to resist motion of the input mechanism. Additionally or alternatively to one or more of the examples disclosed above, in some examples, varying the variable amount of coupling comprises adjusting a stiffness of a variable stiffness element configured to transfer motion of the haptic feedback mass to the input mechanism.

Some examples of the disclosure are directed to a method comprising receiving a first input at an input mechanism, the input mechanism configured to move in a first direction in response to the first input, sensing the first input at the input mechanism based on the movement of the input mechanism in the first direction, and receiving a second input at an input mechanism, the input mechanism configured to move in a second direction, different from the first direction, in response to the second input, displacing the input mechanism in the first direction, an amount of displacement based on a value determined from the sensing the first input. Additionally or alternatively to one or more of the examples disclosed above, in some examples, sensing the first input is performed by a pressure sensitive element and sensing the second input is performed by an optical encoder. Additionally or alternatively to one or more of the examples disclosed above, in some examples, sensing the first input is performed by a pressure sensitive element and sensing the second input is performed by a capacitive sensor. Additionally or alternatively to one or more of the examples disclosed above, in some examples, sensing the first input is performed by a pressure sensitive element and sensing the second input is performed by a magnetic sensor. Additionally or alternatively to one or more of the examples disclosed above, in some examples, the method further comprises: determining whether an amount of movement resulting from the second input exceeds a threshold amount of movement, wherein displacing the mechanical input is in accordance with a determination that the amount of movement exceeds the threshold amount of movement. Additionally or alternatively to one or more of the examples disclosed above, in some examples, wherein the value determined from sensing the first input is an amount of force applied to the input mechanism. Additionally or alternatively to one or more of the examples disclosed above, in some examples, the first direction is along a first axis and the second direction is a rotation about the first axis. Additionally or alternatively to one or more of the examples disclosed above, in some examples, displacing the input mechanism is caused by a piezoelectric element.

Some examples of the disclosure are directed to an apparatus comprising means for receiving a first input at an input mechanism, the input mechanism configured to move in a first direction in response to the first input, means for sensing the first input at the input mechanism based on the movement of the input mechanism in the first direction, and means for receiving a second input at an input mechanism, the input mechanism configured to move in a second direction, different from the first direction, in response to the second input, and means for displacing the input mechanism in the first direction, an amount of displacement based on a value determined from the sensing the first input. Additionally or alternatively to one or more of the examples disclosed above, in some examples, sensing the first input is performed by a pressure sensitive element and sensing the second input is performed by an optical encoder. Additionally or alternatively to one or more of the examples disclosed above, in some examples, sensing the first input is performed by a pressure sensitive element and sensing the second input is performed by a capacitive sensor. Additionally or alternatively to one or more of the examples disclosed above, in some examples, sensing the first input is performed by a pressure sensitive element and sensing the second input is performed by a magnetic sensor. Additionally or alternatively to one or more of the examples disclosed above, in some examples, the apparatus further comprises means for determining whether an amount of movement resulting from the second input exceeds a threshold amount of movement, wherein displacing the mechanical input is in accordance with a determination that the amount of movement exceeds the threshold amount of movement. Additionally or alternatively to one or more of the examples disclosed above, in some examples, the value determined from sensing the first input is an amount of force applied to the input mechanism. Additionally or alternatively to one or more of the examples disclosed above, in some examples, the first direction is along a first axis and the second direction is a rotation about the first axis. Additionally or alternatively to one or more of the examples disclosed above, in some examples, displacing the input mechanism is caused by a piezoelectric element.

Some examples of the disclosure are directed to a non-transitory computer-readable storage medium having stored therein instructions, which when executed by a processor cause the processor to perform a method comprising receiving a first input at an input mechanism, the input mechanism configured to move in a first direction in response to the first input, sensing the first input at the input mechanism based on the movement of the input mechanism in the first direction, and receiving a second input at an input mechanism, the input mechanism configured to move in a second direction, different from the first direction, in response to the second input, displacing the input mechanism in the first direction, an amount of displacement based on a value determined from the sensing the first input. Additionally or alternatively to one or more of the examples disclosed above, in some examples, sensing the first input is performed by a pressure sensitive element and sensing the second input is performed by an optical encoder. Additionally or alternatively to one or more of the examples disclosed above, in some examples, sensing the first input is performed by a pressure sensitive element and sensing the second input is performed by a capacitive sensor. Additionally or alternatively to one or more of the examples disclosed above, in some examples, sensing the first input is performed by a pressure sensitive element and sensing the second input is performed by a magnetic sensor. Additionally or alternatively to one or more of the examples disclosed above, in some examples, the method further comprises determining whether an amount of movement resulting from the second input exceeds a threshold amount of movement, wherein displacing the mechanical input is in accordance with a determination that the amount of movement exceeds the threshold amount of movement. Additionally or alternatively to one or more of the examples disclosed above, in some examples, the value determined from sensing the first input is an amount of force applied to the input mechanism. Additionally or alternatively to one or more of the examples disclosed above, in some examples, the first direction is along a first axis and the second direction is a rotation about the first axis. Additionally or alternatively to one or more of the examples disclosed above, in some examples, displacing the input mechanism is caused by a piezoelectric element.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
   a housing;
   an input mechanism cooperatively engaged with the housing and configured to rotate in a first direction about an axis;
   an input sensor configured to sense an input at the input mechanism based on rotation of the input mechanism; and
   a force sensor coupled to the input mechanism and configured to sense an amount of force applied to an external surface of the input mechanism along a second the axis in a second direction orthogonal to the first direction; and
   an actuator coupled to the input mechanism and configured to displace the input mechanism with an applied displacement force along the axis, wherein:
      in accordance with the amount of force sensed by the force sensor being greater than a threshold amount of force, the applied displacement force is a first applied displacement force; and
      in accordance with the amount of force sensed by the force sensor being less than the threshold amount of force, the applied displacement force is a second applied displacement force, wherein a first characteristic of the first applied displacement force is less than the first characteristic of the second applied displacement force.

2. The electronic device of claim 1, wherein the force sensor is a capacitive force sensor, and the amount of force is determined based on a change in capacitance.

3. The electronic device of claim 1, wherein the actuator and the force sensor are coupled to the input mechanism at a first distal end of the input mechanism.

4. The electronic device of claim 1, wherein the force sensor is configured to determine a direction of the force applied to the input mechanism.

5. The electronic device of claim 1, wherein the actuator comprises a piezoelectric element.

6. The electronic device of claim 1, wherein first characteristic comprises an amplitude characteristic, a duration characteristic or a velocity characteristic.

7. The electronic device of claim 1, wherein a second characteristic of the first applied displacement force is less than the second characteristic of the second applied displacement.

8. The electronic device of claim 1, wherein the force sensor is disposed between the actuator and the input mechanism.

9. The electronic device of claim 1, further comprising:
   an encoder wheel coupled to the input mechanism; and a mounting plate coupled to the encoder wheel and the force sensor.

10. The electronic device of claim 1, further comprising:
a processor coupled to the force sensor and the actuator, the processor configured to compensate a measurement of the force sensor based on the applied displacement force along the axis by the actuator.

11. A method comprising:
receiving a first input at an input mechanism, the input mechanism configured to rotate in a first direction about an axis in response to the first input;
sensing the first input at the input mechanism based on a movement of the input mechanism in the first direction;
receiving a second input at the input mechanism at a force sensor, the input mechanism configured to move in a second direction, orthogonal to the first direction, in response to the second input;
displacing the input mechanism by a force actuator, with an applied displacement force along the axis, wherein:
in accordance with the second input sensed by the force sensor being greater than a threshold amount of force, the applied displacement force is a first applied displacement force; and
in accordance with the second input sensed by the force sensor being less than the threshold amount of force, the applied displacement force is a second applied displacement force, wherein a first characteristic of the first applied displacement force is less than the first characteristic of the second applied displacement force.

12. The method of claim 11, wherein the force sensor is a capacitive force sensor, and the second input comprises an amount of force determined based on a change in capacitance.

13. The method of claim 11, further comprising:
determining whether an amount of movement resulting from the first input exceeds a threshold amount of movement;
wherein displacing the input mechanism is in accordance with a determination that the amount of movement exceeds the threshold amount of movement.

14. The method of claim 11, wherein the force actuator and the force sensor are coupled to the input mechanism at a first distal end of the input mechanism.

15. The method of claim 11, further comprising:
compensating a measurement of the force sensor based on the applied displacement force along the axis by the force actuator.

16. A non-transitory computer-readable storage medium having stored therein instructions, which when executed by a processor cause the processor to perform a method comprising:
receiving a first input at an input mechanism, the input mechanism configured to rotate in a first direction about an axis in response to the first input;
sensing the first input at the input mechanism based on a movement of the input mechanism in the first direction;
receiving a second input at the input mechanism at a force sensor, the input mechanism configured to move in a second direction, orthogonal to the first direction, in response to the second input;
displacing the input mechanism by a force actuator, with an applied displacement force along the axis, wherein:
in accordance with the second input sensed by the force sensor being greater than a threshold amount of force, the applied displacement force is a first applied displacement force; and
in accordance with the second input sensed by the force sensor being less than the threshold amount of force, the applied displacement force is a second applied displacement force, wherein a first characteristic of the first applied displacement force is less than the first characteristic of the second applied displacement force.

17. The non-transitory computer-readable medium of claim 16, wherein the force sensor is a capacitive force sensor, and the second input comprises an amount of force determined based on a change in capacitance.

18. The non-transitory computer-readable medium of claim 16, wherein the force actuator and the force sensor are coupled to the input mechanism at a first distal end of the input mechanism.

19. The non-transitory computer-readable storage medium of claim 16, further comprising:
compensating a measurement of the force sensor based on the applied displacement force along the axis by the force actuator.

20. The non-transitory computer-readable storage medium of claim 16, further comprising:
determining whether an amount of movement resulting from the first input exceeds a threshold amount of movement;
wherein displacing the input mechanism is in accordance with a determination that the amount of movement exceeds the threshold amount of movement.

* * * * *